June 10, 1969 W. STEINKOPF 3,449,510

CIRCUIT ARRANGEMENT FOR PRODUCING A DISSYMMETRICAL SWITCHING SIGNAL IN AN NTSC-PAL CONVERSION SYSTEM

Filed Sept. 16, 1965

Sheet 1 of 4

INVENTOR.
WOLFGANG STEINKOPF
BY
Frank R. Trifari
AGENT

INVENTOR.
WOLFGANG STEINKOPF
BY
Frank R. Trifari
AGENT

INVENTOR.
WOLFGANG STEINKOPF
BY
Frank R. Trifari
AGENT

INVENTOR.
WOLFGANG STEINKOPF
BY
AGENT

United States Patent Office 3,449,510

Patented June 10, 1969

3,449,510

CIRCUIT ARRANGEMENT FOR PRODUCING A DISSYMMETRICAL SWITCHING SIGNAL IN AN NTSC-PAL CONVERSION SYSTEM

Wolfgang Steinkopf, Krefeld, Germany, assignor, by mesne assignments, to U.S. Philips Corporation, New York, N.Y., a corporation of Delaware Filed Sept. 16, 1965, Ser. No. 487,658

Claims priority, application Netherlands, Sept. 19, 1964, 6410975

Int. Cl. H04n 5/38, 5/44; H03k 3/10

U.S. Cl. 178—5.4 5 Claims

ABSTRACT OF THE DISCLOSURE

In a PAL color television system, or an NTSC–PAL conversion system, the switching signal for the PAL signals is dissymmetrical, having one state for one stroke period and the preceding and succeeding fly back periods, and another state for the next succeeding stroke period. The use of such a switching signal eliminates errors which result from switching the burst signal from line-to-line.

The invention relates to a circuit arrangement for producing a switching signal in colour television apparatus suitable for handling and/or converting a colour television signal which contains a luminance signal as well as a subcarrier wave signal on which, during a stroke period of a line, two colour components are modulated in quadrature and, during a part of the fly-back period, a burst signal, the said circuit arrangement which is controlled by means of line pulses supplying a switching signal having half the frequency of the line pulses which is applied to switching means for switching the phase from line to line of either at least one colour component of the television signal or of the subcarrier wave signal derived from the burst signal.

As is known, a new colour television signal has been developed in Germany, the so-called PAL (Phase Alternation Lines) system.

As is known, a colour television signal built up according to the PAL-system has the shape $$E_N = Y + A \qquad (1)$$

during one line and the shape $$E_R = Y + B \qquad (2)$$

during the subsequent line.

In these two equations, Y is the luminance signal and the signals A and B are given respectively by $$A = P \cos(\omega t + \varphi) + R \sin(\omega t + \varphi) - b \sin \omega t \qquad (3)$$

$$B = -P \cos(\omega t + \varphi) + R \sin(\omega t + \varphi) - b \sin \omega t \qquad (4)$$

In Equations 3 and 4 P is one and R is the other colour component which are modulated with a phase difference of 90° on a subcarrier wave with angular frequency $\omega$. In addition $\varphi$ is an arbitrary phase angle which determines which colour components are represented by P and R. For example, it will hold for $\varphi=0$ that $P=(R-Y)$, being the red colour difference signal, and $R=(B-Y)$, being the blue colour difference signal. On the contrary for $\varphi=33°$, $P=I$ and $R=Q$, the respective colour components composed of wide bands and narrow bands as is known from the NTSC-system (National Television System Committee) used in the United States of America. In this case I and Q themselves are composed of the three basic colour signals red (R) blue (B) and green (G). The luminance signal Y also is a combination of the said three basic colour signals so that also when the colour difference signals are used, the green colour difference signal $(G-Y)$ can easily be derived from the signals $(R-Y$ and $(B-Y)$.

In the Equations 3 and 4 $b \sin \omega t$ further is the burst signal being the colour synchronisation signal which is transmitted only during the horizontal or line fly-back period $\tau$, while the colour components modulated on the subcarrier wave are transmitted during the horizontal stroke period.

It may be seen that the difference between the signals A and B consists in that from line to line one of the two colour components (in the present example, the component P) is shifted in phase through 180°. This has been done inter alia to remove the influence on the colour reproduction of a phase shift in the colour components modulated on the subcarrier wave which may occur during the transmission of the signals. The cross-talk effect also of one colour component on the other colour component occurring during modulation as a result of the fact that one of the two components is a wide band signal modulated on the subcarrier wave according to the partial single side band principle and the other is a narrow band signal modulated on the subcarrier wave according to the complete double side band principle, can be avoided without the use of extra filters.

In order to readily reproduce the signals at the receiver end when a PAL signal is received it is necessary to switch from line to line, either the incoming colour signal, or the sub-carrier wave signal derived from the burst signal.

However, according to the recognition of the invention this switching may present difficulties in connection with the burst signal. In fact, when the colour signal is switched from line to line, the burst signal would also be switched as a result of which an undesired phase step occurs each time in the said burst signal. Of course, it is possible to separate the burst signal from the colour components transmitted during the stroke period by means of a gate circuit controlled with line fly-back pulses. Since only the colour components need be switched from line to line, the problem of the co-switching of the above burst signal does not exist then.

However, a particular efficacious circuit arrangement is that in which from the synchronous demodulator which supplies the blue colour difference signal $(B-Y)$ also a control signal is derived for the automatic intensity control of the colour amplifiers which amplify the colour components modulated on the sub-carrier wave. At the same time a control signal may be derived from the synchronous demodulator which supplies the red colour difference signal $(R-Y)$ for synchronizing the local oscillator which produces the sub-carrier wave, which sub-carrier wave has to be added to the synchronous demodulator. When in that case the sub-carrier wave signal derived from the oscillator is switched from line to line, it will be clear that again phase steps will occur when the sub-carrier wave signal is switched over during the occurrence of the burst signal.

The same problem presents itself, when a received PAL-signal is to be converted into an NTSC-signal. Such a conversion may be necessary in relay stations in which a PAL-signal is received but an NTSC-signal has to be transmitted. In that case also, as will be explained below, the burst signal may not be co-switched, because then a phase error for the burst signal occurs in the resulting signal. Such a converter may also be necessary when a receiver is available which is suitable for the NTSC-system and which is to be made suitable also for the PAL-system.

Naturally it is also possible to convert a received NTSC-signal into a PAL-signal. Such cases may present themselves when, for example, via a relay satelite, an NTSC-signal is received from the USA or from Japan, which signal has to be transmitted in Europe as a PAL-signal. Such a conversion may also be necessary when the transmission paths in the Eurovision television broadcasting stations operate according to the PAL-system, but in the countries themselves transmission is effected according to the NTSC-system. In that case, a trans-mitter will produce and transmit an NTSC-system, but a converter from NTSC into PAL must be arranged for converting a PAL-signal for the Eurovision television broadcasting stations. Also in the case of converting NTSC into PAL, the burst signal must not be co-switched from line to line.

In order to realize all this, the circuit arrangement according to the invention is characterised in that the said circuit arrangement is constructed so that a dissymmetrical switching signal is supplied which, during one stroke period plus two fly-back periods, one of the associated line and one of the subsequent line, has one polarity, and, during the stroke period of the next line, has the other polarity.

Because one polarity has a duration of one stroke period plus two fly-back periods, the burst signal which is transmitted each time only during a fly-back period will experience no influence of the switching.

In order that the invention may readily be carried into effect, a few possible embodiments of circuit arrangements according to the invention will now be described in greater detail, by way of example, with reference to the accompanying figures, in which FIGURE 1 is a block-schematic diagram of part of a so-called PAL-receiver for visual averaging in which demodulation is carried out synchronously in the $(R-Y)$ and the $(B-Y)$ directions, and in which the signal for the automatic contrast control (A.C.R.) for colour amplifier and the control signal for the local oscillator are derived from the $(B-Y)$ and $(R-Y)$ demodulator respectively, FIGURE 2 is a vector diagram to explain the operation of the circuit arrangement shown in FIGURE 1.

FIGURES 3*a*, 3*b* and 3*c* show signals which may occur in the circuit arrangement shown in FIGURE 1.

Figure 5:
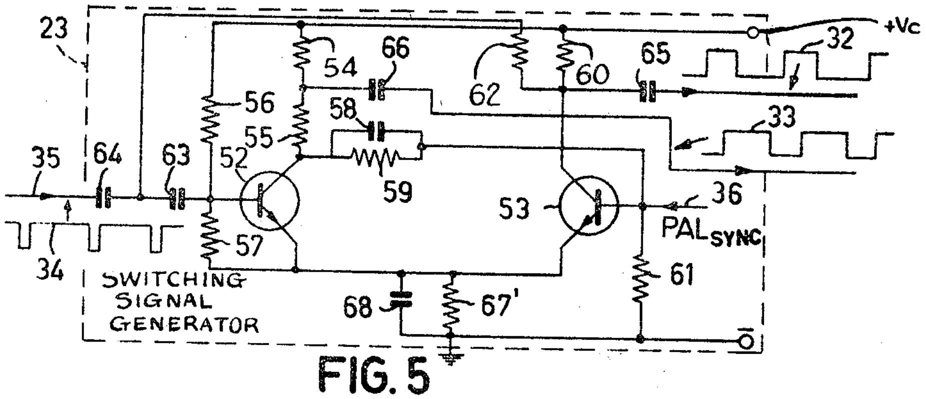
FIGURE 5 is a possible relaxation generator for producing a switching signal required according to the invention.
Figures 6A, 6B, 6C, 6D:
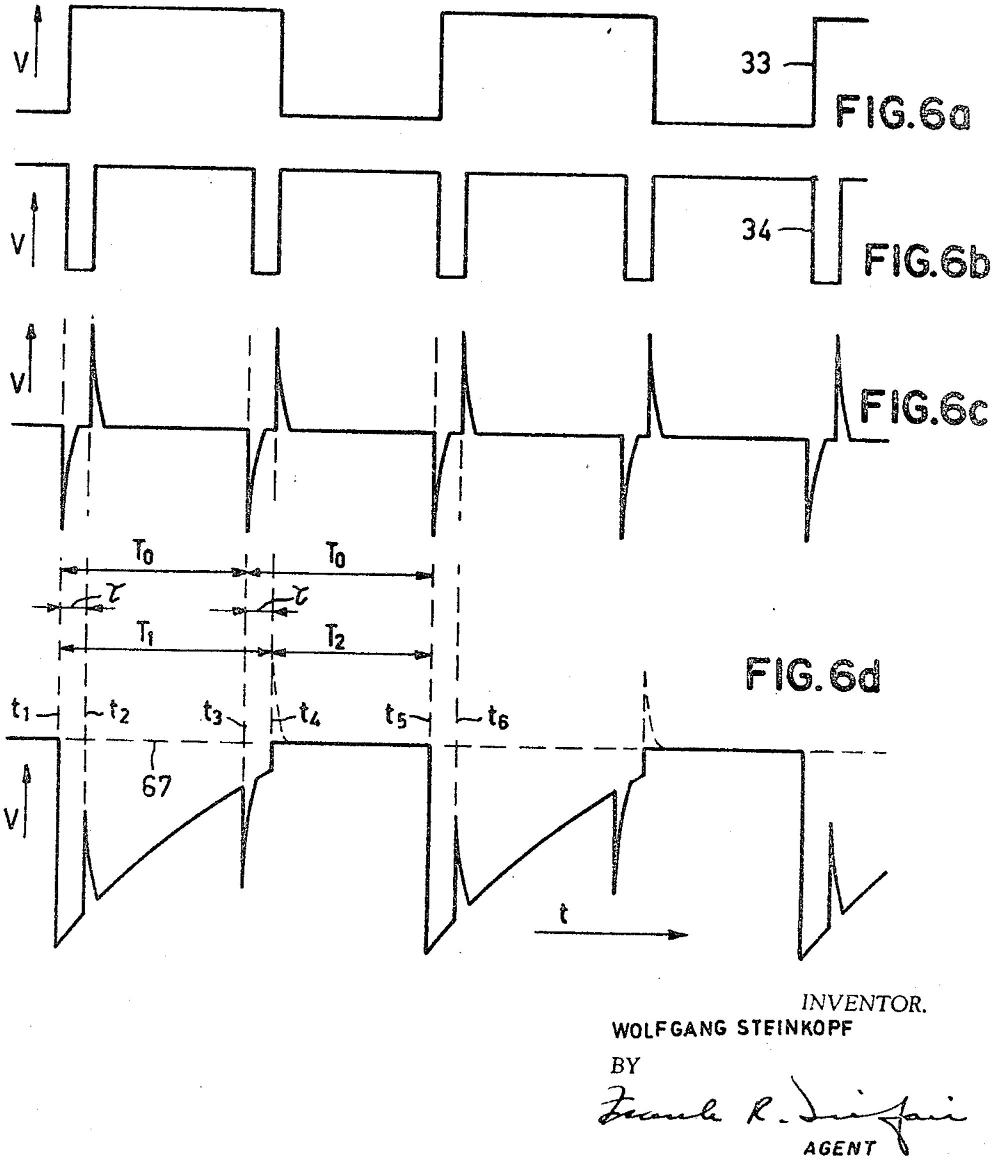
Figure 7:
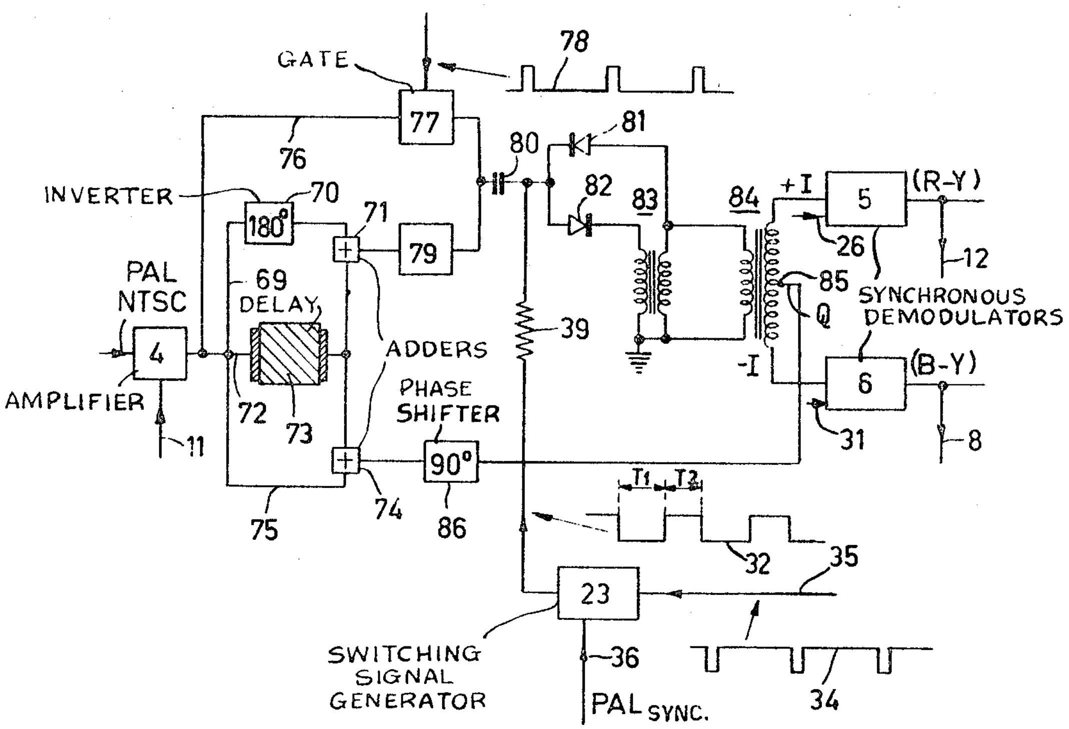

FIGURES 6*a*, 6*b*, and 6*c* show signals which occur in the generator shown in FIGURE 5, and FIGURE 7 is a circuit diagram of part of a receiver which is suitable both for receiving a PAL-signal and an NTSC-signal.

Figure 1:
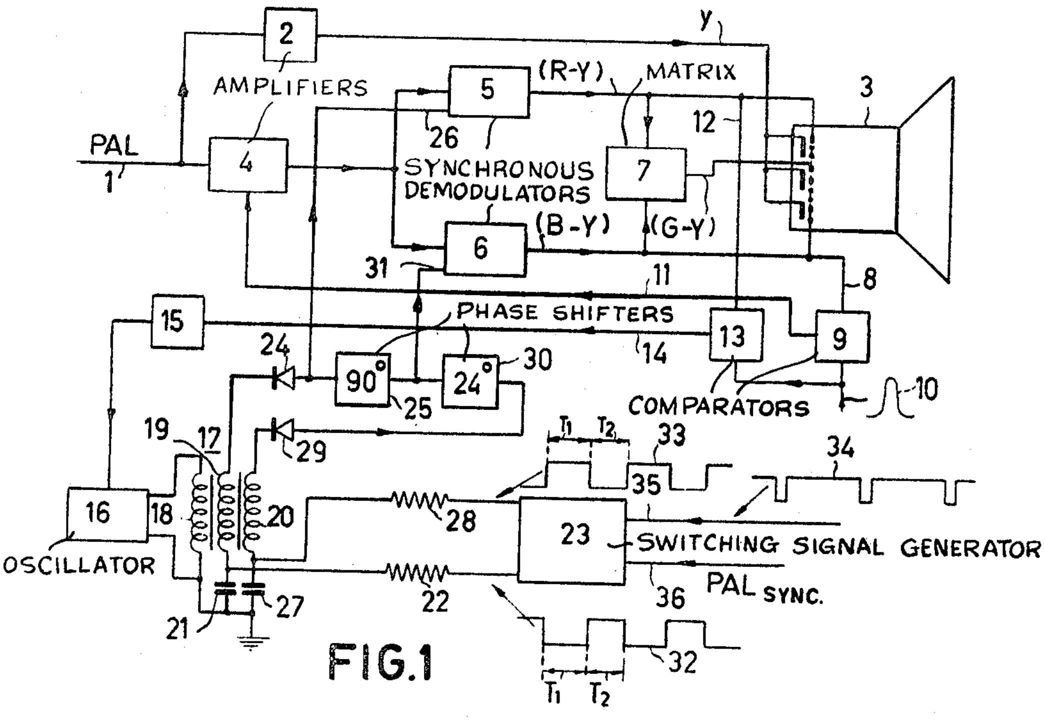

In FIGURE 1, 1 is an input terminal to which a signal built up according to the PAL-system is applied, i.e. a signal which, during one line, has the shape as shown by the Equation 1 and, during the subsequent line, a signal as indicated by Equation 2. The luminance signal Y of the said signal is applied to the luminance amplifier 2, which amplifies the luminance signal Y and supplies it to the interconnected cathodes of the three-gun colour picture tube 3. From the luminance amplifier 2 may also be derived the synchronisation signals for synchronizing the line and image deflection circuits which are not shown in the circuit diagram of FIGURE 1.

The PAL-signal is also applied to the colour amplifier 4, which exclusively amplifies the signals A and B as indicated by the Equations 3 and 4. The amplifier 4 is followed by two synchronous demodulators 5 and 6, the synchronous demodulator 5 of which supplies the red colour difference signal $(R-Y)$ and the synchronous demodulator 6 supplies the blue colour difference signal $(B-Y)$. From the signals $(R-Y)$ and $(B-Y)$ the green colour difference signal $(G-Y)$ is derived in the device 7. The resulting three colour difference signals are applied to the three Wehnelt cylinders of the three-gun picture tube 3, and, together with the luminance signal Y applied to the cathodes, ensure that the tube 3 can reproduce a colour television image.

From the synchronous demodulator 6 a signal is applied, also through the line 8, to a first comparison stage 9 which is gated by means of line fly-back pulse 10. Since the burst signal $b \sin \omega t$ appears only during the line fly-back periods, it is possible to ensure, by means of the gating signal 10, that the comparison stage 9 supplies a control signal which is directly proportional to the amplitude $b$ of the burst signal. The resulting control signal is applied, through line 11, to the colour amplifier 4 and serves for the automatic contrast control (A.C.C.) of the said colour amplifier.

A signal is derived from the synchronous demodulator 5, through line 12, and applied to the second comparison stage 13. This comparison stage also is gated by means of the line fly-back pulses 10 and consequently a control signal appears at the output 14 of the second comparison stage 13 and is applied to the reactance circuit 15. This reactance circuit 15 in turn controls the local oscillator 16 which produces the sub-carrier wave signal. Consequently, the control signal of the terminal 14 ensures the synchronisation of the local oscillator.

A transformer 17, which comprises a primary 18 and two secondaries, namely the windings 19 and 20, is arranged at the output of the local oscillator 16. One end of the secondary 19 is connected to earth through a capacitor 21, and, through a resistor 22, to a generator 23 which will be described below. The other end of the winding 19 is connected to the cathode of a switching diode 24. The anode of the switching diode 24 is connected at one end to a phase-shifting network 25 and at the other end to an input terminal 26 of the synchronous demodulator 5.

One end of the other secondary 20 is connected to earth through a capacitor 27 and, through a resistor 28, to the generator 23. The other end of the winding 20 is connected to the cathode of the second switching diode 29, the anode of which is connected to a phase shifting network 30.

The phase shifting networks 25 and 30 are interconnected and the junction is connected to the input terminal 31 of the synchronous demodulator 6.

As appears from the recorded numerals in the phase shifting networks 25 and 30, the network 25 shifts a sub-carrier wave signal supplied to it through 90°, while the network 30 shifts the phase of the sub-carrier wave signal applied to it through 24°. The operation of the said phase-shifting networks is such that it does not matter to what side the sub-carrier wave signal is applied. The phase shift indicated will always occur. Moreover, a signal which is applied, for example, through the diode 29 and ultimately reaches the terminal 26 experiences a phase shift of $90°+24°=114°$.

The diodes 24 and 29 are switched by the switching signals 32 and 33 respectively which are supplied by the generator 23. The said switching signals are derived in the generator 23 from line fly-back pulses 34 which are applied, for controlling the generator 23, to the input 35 thereof. To a second input terminal 36 of the generator 23 is supplied the so-called PAL-synchronisation signal which is also transmitted with the PAL-signal and which serves to establish the correct phase of the switching signal. The line fly-back pulses 10 and 34 may be derived from the line output transformer which is included in the line deflection circuit of the receiver.

The operation of the generator 23 will be described in greater detail, but first the operation of the circuit arrangement shown in FIGURE 1 will be explained.

For the explanation of this operation, reference is made to the vector diagram shown in FIGURE 1. In drawing up the said vector diagram it has been assumed that the phase angle $\varphi$ in the Equations 3 and 4 has a value of 33° and that the colour component P is equal to the colour component I and the colour component R is equal to the colour components Q, I and Q again being the known colour components from the NTSC-system. When, during a given line, a signal is transmitted according to Equation 3, this is the normal signal as would be transmitted also in the case of an NTSC-transmission. Consequently, the component I which is transmitted during such a line, is characterized by $I_N$ and the component Q which is then transmitted is characterized by $Q_N$. These components $I_N$ and $Q_N$ are shown in the vector diagram of FIGURE 2 along the principal axis. In the PAL-system, during the subsequent line the colour component is inverted in phase so that a signal is transmitted according to Equation 4. To distinguish from the signal which was transmitted during the preceding line, the component I is characterized by $I_R$ because the said component is shifted in phase through 180°. The R is then the abbreviation for the word reversible. In the vector diagram shown in FIGURE 2, the said component $I_R$ is plotted accordingly. Since only the component I is shifted in phase through 180° from line to line, and not the component Q, only the normal component $Q_N$ need be plotted in the vector diagram and the said component maintains the same phase from line to line.

Figure 2:
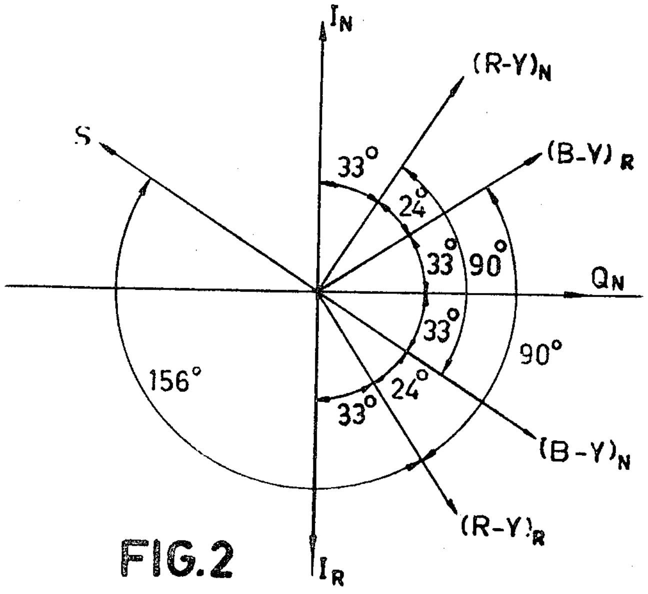

When a signal is transmitted with the components $I_N$ and $Q_N$, the phases of the red $(R-Y)$ and the blue colour difference signal $(B-Y)$ in the vector diagram shown in FIGURE 2 are indicated by $(R-Y)_N$ and $(B-Y)_N$ respectively. When on the contrary a signal is transmitted which contains the components $I_R$ and $Q_N$, the red colour difference signal $(R-Y)$ is indicated by the vector $(R-Y)_R$ and the blue colour difference signal by $(B-Y)_R$. From the vector diagram shown in FIGURE 2 it follows that the phase angle between the components $(R-Y)_N$ and $(B-Y)_N$ is exactly 90°. Between the component $(R-Y)_N$ and the component $(B-Y)_R$ is 24° and between the component $(R-Y)_N$ and $(R-Y)_R$ it is 114°.

In the circuit diagram shown in FIGURE 1, it is assumed that the local oscillator supplies a sub-carrier wave signal with such a phase that at the secondary 19 a signal is formed which has a phase as indicated by the vector $(R-Y)_N$. During the line that a signal is received with the components $I_N$ and $Q_N$, the diode 24 must be opened to demodulate the synchronous demodulator 5 in the direction $R-Y$ because then the signal of the winding 19 must be applied directly, through the diode 24, to the synchronous demodulator 5. Simultaneously a signal is applied to the synchronous demodulator 6, which is shifted in phase through 90° and this is achieved in that the signal of the diode 24 simultaneously reaches the synchronous demodulator 6, through the network 25. Naturally, during this period the diode 29 is cut off. During the subsequent line a signal must be applied to the synchronous demodulator 5, which is shifted in phase through approximately 114° with respect to the phase of the component $(R-Y)_N$ and this is possible because during that line the diode 29 is opened and the signal from the winding 20 reaches the terminal 26 through the phase shifting networks 30 and 25. Since the signal at the winding 20 will have the same phase as the signal at the winding 19, this meets the requirement imposed. At the same time a signal must be applied to the synchronous demodulator 6, which differs 24° in phase with respect to the phase of the component $(R-Y)_N$ and this is met because from the diode 29 the signal for the input terminal 31 exclusively traverses the phase shifting network 30. In this manner it is possible by switching a sub-carrier wave signal by means of the diodes 21 and 29 to ensure that each time the same colour difference signals appear at the outputs of the demodulators 5 and 6.

In the vector diagram of FIGURE 2, the vector S indicates the position of the burst signal. It appears from this vector diagram that the phase of the burst signal is opposed to that of the component $(B-Y)_N$. This means that during the time that the diode 24 is in the conducting condition the synchronous demodulators 5 and 6 apply the desired control signals for the comparison stages 9 and 13. In fact, during that period the burst signal is multiplied in the synchronous demodulator 5 by a sub-carrier wave signal which differs 90° in phase with respect to the burst signal (compare the vectors S and $(R-Y)_N$ in FIGURE 2), which phase difference of 90° is exactly necessary to derive the desired control signal for the local oscillator 16 from the comparison stage 13 during the fly-back period.

Likewise, when the diode 24 is opened, the burst signal S will be multiplied in the synchronous demodulator 6 by a sub-carrier wave signal which has a phase as is determined by the components $(B-Y)_N$ which phase again is exactly necessary to derive a control signal for the A.C.C. for the amplifier 4, from the comparison stage 9 during the fly back period.

When on the contrary the diode 29 is in the conducting condition, the burst signal S is multiplied in the synchronous demodulator 5 by a sub-carrier wave signal which has a phase as is given by the component $(R-Y)_R$ which phase does not differ by the desired 90° with respect to the phase of the component S as clearly appears from FIGURE 2.

Figures 3A, 3B, 3C:
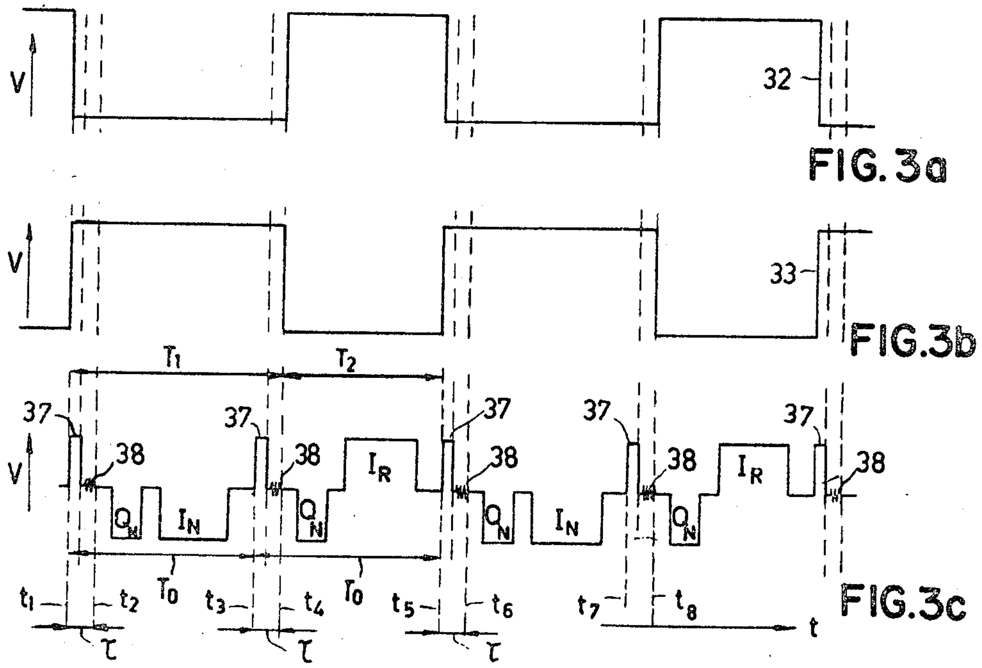

Likewise, when the diode 29 is in the conducting condition the burst signal will be multiplied, during the fly-back period, in the synchronous demodulator 6 by a sub-carrier wave signal, but has a phase as indicated by the component $(B-Y)_R$. Since this phase does not differ by 180° with respect to the phase of the burst signal, as was the case with the component $(B-Y)_N$, the desired control signal cannot be derived from the synchronous demodulator 6 also when the diode 29 is in the conducting condition. This involves that during a fly-back period, namely the period that a burst signal $S=-b \sin \omega t$ is transmitted, the diode 29 may never be in the conducting condition, but exclusively the diode 24. According to the principle of the invention, this is achieved by making the switching signals 32 and 33 dissymmetrical, that is to say, the time $T_1$ that the switching signal 32 opens the diode 24 has been chosen to be longer than the time $T_2$, being the time that the switching signal 33 opens the diode 29. This appears from the signals shown in FIGURE 3. In fact, FIGURE 3*a* shows the switching signal 32 and in FIGURE 3*b* the switching signal 33 is shown. FIGURE 3c shows the video signal as is applied to the input terminal 1. FIGURE 3*c* also shows, in addition to the colour components ${}_N$, $Q_N$ and $I_R$ (which are shown for convenience as the envelopes without the sub-carrier wave on which they are modulated), the line synchronisation pulses 37 and the burst signal 38. As appears from FIGURE 3*c*, the burst signal 38 always occurs on the trailing edge of the line synchronisation pulses 37 and consequently during a line fly-back period. When the signals 32 and 33 are considered it may be seen that the time $T_1$ not only includes the stroke period of the line that the signals $I_N$ $Q_N$ are transmitted, but also the fly-back period from $t_1$ to $t_2$ associated with that line, and the fly-back period from $t_3$ to $t_4$ associated with the subsequent line. This means that the switching signal 32 which brings the diode 24 in the conducting condition, keeps the said diode in the conducting condition both during the time from $t_1$ to $t_2$ and during the time from $t_3$ to $t_4$ so that the above conditions are fulfilled. It also follows from FIGURE 3 that the time $T_2$ only includes the stroke period of the line during which the components $I_R$ and $Q_N$ are transmitted. During the subsequent line again the diode 24 is opened and during this line again two fly-back periods are included, namely the fly-back period from $t_5$ to $t_6$ and the fly-back period from $t_7$ to $t_8$.

Consequently, the switching signal must have a dissymmetrical shape by which is understood that the said switching signal during the period $T_1$ must have one polarity and during the period $T_2$ must have the other polarity. When $T_0$ is termed a line period, that is to say $T_0$=stroke period+fly-back period, and when the fly-back period is termed $\tau$, $T_1$ is $T_0+\tau$ and $T_2=T_0-\tau$. From this it follows that $T_1=T_2+2\tau$. This means that the switching signal has one polarity during one stroke period plus two fly-back periods, one of the associated line and one of the subsequent line, and has the other polarity during the stroke period of the subsequent line.

Figure 4:
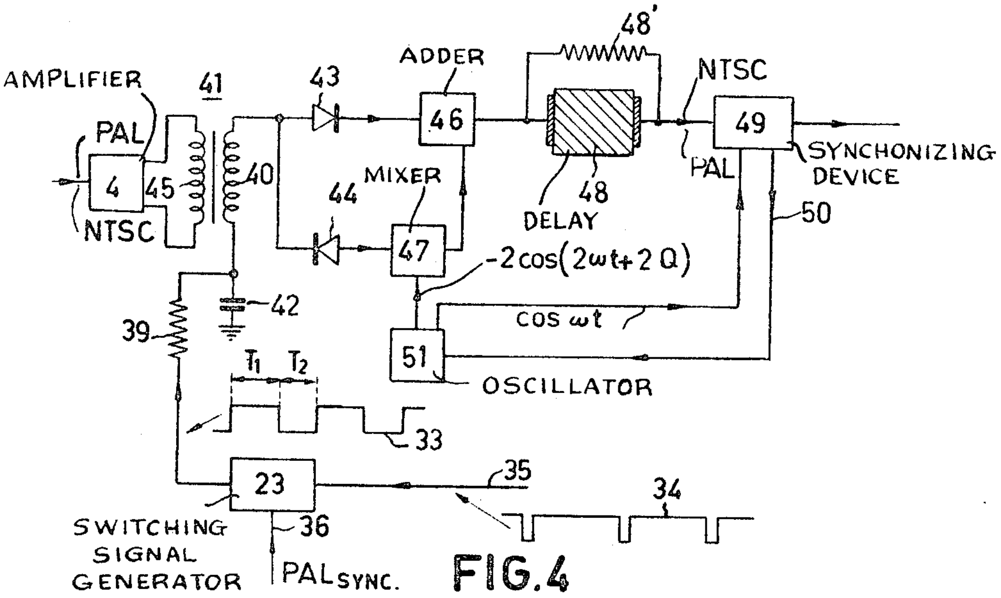
FIGURE 4 is a circuit arrangement for converting a PAL-signal into an NTSC-signal with the use of a delay circuit, or, when this delay circuit is omitted, for converting an NTSC-signal into a PAL-signal.

FIGURE 4 shows an embodiment of a circuit arrangement for converting a PAL-signal into an NTSC-signal, or conversely, for converting an NTSC-signal into a PAL-signal. Such a circuit arrangement is described in detail in U.S. Patent No. 3,384,706 and this circuit arrangement will consequently be described only with a view to the formation of the required switching signal. In the circuit arrangement shown in FIGURE 4 the switching signal 33 is again derived from the generator 23 and applied to the secondary 40 of the transformer 41 through the resistor 39. The secondary 40 is connected at one end to earth through the capacitor 42 and at the other end to the anode of a switching diode 43 and the cathode of a second switching diode 44. The primary 45 of the transformer 41 is connected to the colour amplifier 4, to the input terminal of which again the PAL-signal or the NTSC-signal is applied. It will consequently be clear that in the circuit arrangement shown in FIGURE 4, not the sub-carrier wave signal is switched, as was the case in the circuit arrangement shown in FIGURE 1, but on the contrary the colour signal itself. From the polarities of the switching signal 33 it follows that during the time $T_1$, the diode 43 is in the conducting condition while this is the case for diode 44 during the time $T_2$. From this it follows, that during the time $T_1$, the colour television signal is directly applied to an adding stage 46 through the diode 43.

During the time $T_2$ on the contrary, the colour television signal is applied to the adding stage 46 through the diode 44 and a mixer stage 47. From the adding stage 46, the signal is applied, on the one hand through the delay circuit 48 which delays the signal over one line period, and on the other hand, through a resistor or impedance 48' which does not delay the signal but attenuates it equally much as the delay circuit 48, to the device 49 which handles the colour signal.

During the time $T_1$ the signal has a shape as shown by Equation 3, on the understanding that during the stroke period of the line in question, the colour components P and R are transmitted, whereas during the fly-back period the burst signal $-b \sin \omega t$ is transmitted. Since during the time $T_1$, the diode 43 is released, the colour television signal is directly applied to the adding stage 46 so that the phase of the burst signal $b \sin \omega t$ does not experience any phase shift and consequently appears unaltered at the adding stage 47. On the contrary, in the mixer stage 47 the signal is multiplied by a signal of the shape $-2 \cos (2\omega t+2\varphi)$, being a signal with the double sub-carrier wave frequency. This signal is applied to the mixer stage 47 so as to shift the component $-P \cos (\omega t+\varphi)$ of the Equation 4 through 180° in phase and simultaneously to leave the component $R \sin (\omega t+\varphi)$ unaffected. Consequently, by applying the signal with the double sub-carrier wave frequency, it is achieved that during the stroke period a signal is formed at the output terminal of the mixer stage 47 which has the same shape as the signal A given by Equation 3.

However, when also the burst signal $-b \sin \omega t$ would be applied to the mixer stage 47, the phase of the burst signal therein will surely experience a change. Since this phase-shifted burst signal will be added to the burst signal which is directly applied to the stage 46, the resulting burst signal which is derived from the output terminal 50 of the device 49 and which serves for the synchronisation of the local oscillator 51, will have a wrong phase. To avoid this it has been ensured that the time $T_1$ is equal to $T_0+2\tau$ as explained with reference to FIGURE 3. From this it follows that the burst signal reaches the adding stage 46 only through the diode 43, and never through the switching diode 44 and the mixer stage 47. It is ensured in this manner that the burst signal which is applied to the device 49 and thence through line 50 to the local oscillator 51, will always have the correct phase.

As already explained, the device shown in FIGURE 4 not only converts a PAL-signal into an NTSC-signal, but also an NTSC-signal into a PAL-signal. In that case the delay circuit 48 may be omitted and the NTSC-signal be applied to the amplifier 4. In that case the applied signal has a shape during each line as shown by Equation 3. During one line this signal is transmitted through the diode 43 to the adding stage 46 and during the subsequent line to the diode 44 and the mixer stage 47. In this path the signal A is then converted into a signal B which again just gives the PAL-signal because during one line the diode 43 is opened and during the other line the diode 44 is opened. In this case also it will be clear that the phase of the burst signal may not be varied, that is to say, the burst signal may reach the adding stage 47 only through diode 43. This is naturally fulfilled again by giving the switching signal the shape as given in FIGURE 3*b*.

FIGURE 5 shows a possible embodiment of a relaxation generator 23 employing two transistors 52 and 53 of the NPN-type. The transistor 52 comprises a collector resistor consisting of the resistors 54 and 55 and obtains its bias voltage by means of a potentiometer consisting of the resistors 56 and 57. Moreover, the collector electrode of the transistor 52 is connected, through the parallel arrangement of a capacitor 58 and a resistor 59, to the base electrode of the other transistor 53. The said transistor 53 is in turn provided with a collector resistor 60 and a base resistor 61. In addition the collector electrode of the transistor 53 is coupled to the base electrode of the transistor 52 through a resistor 62 and a capacitor 63. A further capacitor 64 is arranged in series with the capacitor 63 and the line fly-back pulses 34 are applied to the said capacitor 64 through the line 35. The output signals 32 and 33 are derived from the output circuit of the transistors 53 and 52 through capacitors 65 and 66 respectively. The operation of the circuit arrangement as shown in FIGURE 5 will be described with reference to the signals shown in FIGURE 6. FIGURE 6*a* shows the switching signal 33 which is formed at the collector resistor 54 and 55 of the transistors 52, when the line fly-back pulses 34 as shown in FIGURE 6*b* are applied to the input terminal 35. These line fly-back pulses have a negative-going polarity. The network consisting of the capacitor 64 and the resistor 62 forms a differentiating network which differentiates the line fly-back pulses 34 so that on an approximation a signal is formed as shown in FIGURE 6*c*. (This because in the reproduction of FIGURE 6*c* the varying voltage which is formed at the junction of the resistors 60 and 62 as a result of the alternate conductive and non-conductive condition of the transistor 53 has not been taken into account.)

Let it now be assumed that start is made from an initial condition in which the transistor 52 is in the conducting condition and transistor 53 is in the non-conducting condition. The comparatively large capacitor 63 is then charged through resistors 60 and 62 and the base-emitter path of the transistor 1. As a result of this charge the voltage across the capacitor 63 has such a polarity that the capacitor plate which is connected to the base electrode 52 is negative with respect to the plate which is connected to the capacitor 64. When at the instant $t_1$ (see FIGURE 6) a differentiated negative-going pulse appears, said negative going pulse wants to cut off the NPN transistor 52. As a result of this the collector voltage of the said transistor increases to a positive value and this voltage variation is transmitted, through the parallel arrangement of the elements 58 and 59, to the base electrode of the transistor 53 which is released by the said voltage variation. As a result of this the collector voltage of the transistor 53 decreases and this voltage variation is transmitted in turn to the base electrode of the transistor 52 through the resistor 62 and the capacitor 63. The result of this cumulative effect is that the transistor 52 is suddenly brought in the non-conducting condition and the transistor 53 in the conducting condition. The capacitor 63 can discharge through resistor 62, the transistor 53 which is then in the conducting condition, and the resistor 57. Consequently, a voltage as shown in FIGURE 6*d*, being the super-position of the differentiated pulses from the junction of the capacitors 63 and 64 and the variation of the voltage across the discharge capacitor 63 is formed at the base electrode of the transistor 52. At the instant $t_2$, being the end of the first fly-back pulse, a first positive-going pulse occurs, being the differentiated trailing edge of the first line fly-back pulse. Because the cut-off voltage of the transistor 52 is substantially at the level indicated by the line 67, it will be clear that the said first positive-going pulse is not capable of releasing the transistor 52. At the instant $t_3$, being the beginning of the fly-back period of the subsequent line, a negative-going pulse appears again being the differentiated leading edge of the second line fly-back pulse. Since this again is a negative-going pulse, this pulse tends to release the transistor 52 which has no effect because the transistor 52 is already cut off. At the instant $t_4$, being the end of the fly-back of the subsequent line, a second positive pulse appears which will release the transistor 52. In fact, as shown in broken lines in FIGURE 6*d* at the instant $t_4$, the positive-going pulse then appearing will surpass the cut off level indicated by line 67 and will consequently release the transistor 52. Actually, the part of the pulse above the line 67 does not occur, because as soon as the transistor 52 comes in the conducting condition, the base-emitter diode of the said transistor also comes in the conducting condition and will check a further positive-going of the differentiating pulse. Therefore the variation of the voltage during the time $T_2$ will be substantially as indicated by the solid line in FIGURE 6*d*. At the instant $t_4$ the relaxation generator will have come in its stable condition again and this stable condition will be maintained until the instant $t_5$, being the beginning of the subsequent fly-back period, during which the differentiated negative going pulse will again ensure that the transistor 52 is again cut off and the relaxation generator is brought again in a non-stable condition. Therefore it may be said that every leading edge of a first line fly-back pulse brings the relaxation generator in a non-stable condition and the trailing edge of the second line fly-back pulse again introduces the stable condition. Since the transistor 52 is cut off by the signal shown in FIGURE 6*d* during the time $T_1$ and is released during the time $T_2$, the output signal at the collector electrode of the said transistor will have a shape as shown in FIGURES 3*b* and 6*a*. Since the transistor 53 is always in a conducting condition when the transistor 52 is non-conducting, and conversely, a signal will be formed at the collector electrode of the transistor 53 as is shown in FIGURE 3*a*, being the switching signal 32.

The most important component parts used in the relaxation generator, shown in FIGURE 5, have the following values:

$V_c$=12 volt.
NPN transistor 52=Philips type No. OC139.
NPN transistor 53=Philips type No. OC139.
Resistor 54=1KΩ
Resistor 55=4.7KΩ
Resistor 60=5.6KΩ
Resistor 62=3.9KΩ
Capacitor 63=1.8K pf.
Capacitor 64=27 pf.

From the above values it appears that the capacitor 63 is a comparatively large capacitor which is necessary because it must have a long discharge period mainly with resistor 62 namely such a period that at a given amplitude of the line fly-back pulses 34, the differentiated trailing edge at the instant $t_2$ (see FIGURE 6) is not capable of releasing the transistor 52. It also follows from these values, that the capacitor 64 must be a comparatively small capacitor, because it must form a differentiating network also together with the resistor 62.

It will be clear that the generator 23 can also be constructed in a manner differing from that of FIGURE 5. For example, the transistors 52 and 53 in FIGURE 5 need not be of the NPN-type, but also PNP-type transistors may be used for that purpose. The only difference then is that the polarity of the supply voltage $V_c$ in FIGURE 5 must be reversed as well as the polarity of the line fly-back pulses 34 which are applied to the terminal 35. It is also possible to replace the transistors 52 and 53 by tubes, in which case, naturally, the supply voltage $V_c$ must have a considerably higher value than the above given 12 volts.

In addition it is possible not to use a monostable multivibrator circuit 23 but a bistable multivibrator circuit which is provided with two circuit elements, two transistors or two tubes. To one transistor or tube of the said bistable circuit fly-back pulses 34 are applied and to the other transistor or tube fly-back pulses of opposite polarity are applied. The leading edge of the first pulse of the signal supplied to the first circuit element must cut off the said element, and therewith introduce a flipping over of the multivibrator circuit, while the trailing edge of the subsequent second pulse of the signal applied to the second circuit element must cut off the said element and therewith effect a flipping back of the multivibrator circuit. Therefore, in this manner also it is possible to bring the multivibrator circuit in the one stable condition during the time $T_1$ and in the other stable condition during the time $T_2$.

FIGURE 7 finally shows a circuit diagram of part of a receiver which is suitable both for receiving a PAL-signal and an NTSC-signal.

The signal derived from the colour amplifier 4 is further conveyed through four different paths. The first path extends through a conductor 69 to a phase inverter stage 70 and thence to an adding stage 71. The second path leads through a conductor 72 and a delay circuit 73 which delays the colour signal over one line period, on the one hand to the first adding stage 71 and on the other to the second adding stage 74. Also the third path 75 leads to the said second adding stage 74.

The fourth path 76 finally leads to a gate circuit 77 to which, when a PAL-signal is received, a switching signal 78 consisting of line fly-back pulses is applied which pulses release the gate circuit only during the line fly-back period. When an NTSC-signal is received, the gate 77 is fully released.

The output of the adding stage 71 is connected to a circuit 79, which, for symmetrical reasons, is constructed in a manner similar to that of the gate circuit 77. The interconnected outputs of the substantially equal circuits 77 and 79 are connected through the capacitor 80 to the switching diodes 81 and 82. The symmetry reasons are that the signal which reaches the capacitor 80 through the circuit 77 has a substantially equal impedance as the signal which reaches the said capacitor through the circuit 79. Also in connection with an equal total transit time, such a symmetrical construction is desired.

The anode of the diode 81 is connected to the secondary of a transformer 83 to the primary of which is connected the cathode of the diode 82. The secondary of the transformer 83 is connected to the primary of the second transformer 84. The secondary of this latter transformer is provided with a center tapping 85; one end thereof is further connected to the synchronous demodulator 5, and the other end is connected to the synchronous demodulator 6.

Finally, the adding stage 74 is connected through a 90° phase shifting network 86 to the centre tapping 85. The switching diodes 81 and 82 are controlled with dissymmetrical switching signal 32 derived from the generator 23.

In the circuit arrangement shown in FIGURE 7, it is assumed that $\varphi=33°$, so that $P=I$ and $R=Q$. As is known, in that case the signal $+I \cos(\omega t+33°)$ is formed at the adding state 71 during one line and the signal $-I \cos(\omega t+33°)$ is formed during the subsequent line. These signals are applied to the diodes 81 and 82 through the circuit 79 and the capacitor 80. When the signal $+I \cos(\omega t+33°)$ appears, the diode 81 is released by the signal 32. When the signal $-I \cos(\omega t+33°)$ occurs, the diode 82 conducts the said signal to the transformer 83 which inverts it in phase. Owing to the said switching diodes always a signal $+I \cos(\omega t+33°)$ appears at the primary of the transformer 84.

Also in known manner the signal $+Q \sin(\omega t+33°)$ is formed at the output of the adding stage 74. As a result of the phase shift of 90° in the network 86 a signal of the shape $+Q \cos(\omega t+33°)$ is operative at the tapping 85.

By arranging the tapping 85 at the correct point, a signal $$\alpha I \cos(\omega t+33°)+\beta Q \cos(\omega t+33°) = (R-Y) \cos(\omega t+33°) \quad (5)$$

is formed at the end of the secondary of the transformer 84 connected to the demodulator 5. When the colour components I and Q are defined in the NTSC-system, it holds that $\alpha=0.95$ and $\beta=0.63$.

At the input of the second synchronous demodulator 6 which is connected to the other end of the secondary of the transformer 84 a signal $$-\delta I \cos(\omega t+33°)+\gamma Q \cos(\omega t+33°) = (B-Y) \cos(\omega t+33°) \quad (6)$$

wherein $\delta= 1.10$ and $\gamma=1.70$ is likewise formed.

By synchronous demodulation the demodulator 5 supplies the red colour difference signal $(R-Y)$ and from this demodulator may also be derived through line 12, the control signal for the local oscillator 16 in a manner corresponding to that in the circuit arrangement shown in FIGURE 1.

The synchronous demodulator 6 supplies the blue colour difference signal $(R-Y)$ and the control signal for the A.C.C of the colour amplifier 4 which is derived through the line 8.

As appears from the Equations 5 and 6 pure colour difference signals $(R-Y)$ and $(B-Y)$ modulated on the subcarrier wave are available at the synchronous demodulators 5 and 6. This is possible because, when a PAL-signal is received, the signals $I \cos(\omega t+33°)$ and $Q \cos(\omega t+33°)$ can be produced as two separate signals. As a result of this, no chromatic aberration will be present in the reproduced image irrespective of phase errors which may occur during the transmission of the PAL-colour signals.

When on the contrary an NTSC-signal is received, this latter, naturally is not the case.

However, to be able to receive the said NTSC-signal, the presence of the gate circuit 77 is necessary. In fact, the NTSC-signal has the same shape from line to line. Since the signal is shifted in phase through 180° in the inverter stage 70, the two signals operative at the adding stage 71 (a delayed signal and a phase-inverted signal) are equal signals but they have opposite signs. When an NTSC-signal is received, the said output signal of the adding stage 71 therefore is substantially equal to zero. Since, however, two signals must be available at the transformer 84, the gate 77 is fully opened when an NTSC-signal is received, so that through the said parts the NTSC-signal $$I \cos(\omega t+33°)+Q \sin(\omega t+33°)$$

reaches the diodes 81 and 82.

In this case the diode 81 must always be released which may be ensured by omitting the switching signal 32. The information for this latter and for fully releasing the gate 77, is derived from the fact that when an NTSC-signal is received, the PAL synchronisation signal is not present. In a similar manner as is effected in the so-called "colour killer action" when a black and white signal is received, in which the burst signal is omitted, the information for omitting the pulse synchronisation signal can be used.

A signal $-I \sin(\omega t+33°)+Q \cos(\omega t+33°)$ is formed in this situation at the tapping 85 as a result of the 90° phase shifting network 86. Thus for the synchronous demodulator 5

$$\alpha I \cos(\omega t+33°)+\alpha Q \sin(\omega t+33°)-\beta I \sin(\omega t+33°)+\beta Q \cos(\omega t+33°)=(R-Y) \cos(\omega t+33°)+(\alpha Q-\beta I) \sin(\omega t+33°) \quad (7)$$

becomes available. By multiplying the said signal in the demodulator 5 by $\cos(\omega t+33°)$, the red colour difference $(R-Y)$ is obtained. However, it will be clear that as a result of the presence of the term with the coefficient $(\alpha Q-\beta I)$ in Equation 7 when phase errors occur, also chromatic aberration will occur.

For the synchronous demodulator 6 becomes available $$-\delta I \cos(\omega t+33°)-\delta Q \sin(\omega t+33°)-\gamma I \sin(\omega t+33°)+\gamma Q \cos(\omega t+33°)=(B-Y) \cos(\omega t+33°)-(\delta Q-\gamma I) \sin(\omega t+33°) \quad (8)$$

From the Equation 8 it follows that the demodulator 6 supplies the blue colour difference $(B-Y)$ and that in this case also again as a result of the term $(-\delta Q-\gamma I)$ in the case if phase errors chromatic aberration will occur.

From the nature of the signals as given in the Equations 3 and 4 it follows that when a PAL-signal is received, the burst signal $-b \sin \omega t$ will not appear at the adding stage 71. This signal does appear at the adding stage 74. The said burst signal is shifted in phase through 90° in the network 80. When the burst signal would not appear at all at the input of the capacitor 80 it must be ensured in the receiver that the burst signal which is shifted in phase through 90° is reshifted again. When on the contrary the burst signal would be passed through the gate 77, the phase hereof has experienced no shift so that, together with the phase shifted through 90° of the burst signal passed through the network 86, the ultimate signal gives a phase shift of approximately 45°. This smaller phase shift is simpler to compensate. In addition it has been demonstrated above that, when an NTSC-signal is received, the gate 77 must be fully released. This means that in that case also the burst signal is received through the gate 77. When the burst signal would not be passed through the gate 77 when a PAL-signal is received, unequal conditions are created when a PAL-signal is received, with respect to those when an NTSC-signal is received. However, this is avoided by supplying the switching signal 78 to the gate 77 when a PAL-signal is received, which signal ensures that the gate 77 is released during the occurrence of the burst signal.

However, when the burst signal appears at the capacitor 80, the diodes 81 and 82 must be switched again dissymmetrically. In fact, the diode 81 must always be in the conducting condition during the occurrence of a burst signal since in that case the burst signal from the capacitor 80 is not shifted in phase through 180°.

This involves that the switching signal 32 must be dissymmetrical which means that as above $T_1>T_2$, since, during the time $T_1$ the diode 81 is released and consequently is in the conducting condition each time during two fly-back periods.

What is claimed is:

1. In a system for producing a switching signal for use in conjunction with a PAL color television signal, wherein said color signal comprises a luminance signal, a subcarrier signal which is modulated by two color components in quadrature during a stroke period of a line whereby the phase of one of said components is changed 180° from line to line, a color synchronizing signal occurring during part of the line retrace time, and an information signal for PAL synchronization, and wherein said system comprises a frequency divider circuit including a generator controlled by line frequency pulses from a source of line pulses and a signal derived from said information signal, whereby said generator produces a switching signal with half the line frequency, and switching means to which said switching signal is applied for switching the phase of said one color component 180° from line to line or for switching a sub-carrier signal derived from said color synchronizing signal; the improvement wherein said generator is comprised of a monostable relaxation generator having two switching elements, a resistance capacitance network, means connecting the capacitor of said network to one of said switching elements whereby said capacitor is charged by way of said one element and is discharged via a resistor of said network, so that a discharge voltage is developed across said capacitor, said generator also comprising a differentiating network, means applying said line impulses to said differentiating network, an adder circuit, means for applying said differentiated line impulses and the discharge voltage across said capacitor to said adder circuit and for applying said added voltages to the other switching element with such a polarity that the differentiated front edge of a first line pulse blocks the main current circuit of said other switching element, the differentiated rear edge of said first line pulse together with the capacitor voltage being smaller than the voltage necessary for unblocking said main current circuit, the sum of differentiated rear edge of a second line impulse and said capacitor voltage being larger than the voltage for unblocking said main current circuit of said other switching element.

2. The system of claim 1 wherein the monostable relaxation generator is a multivibrator in which the two switching elements are two transistors coupled together having each a collector resistor and wherein the collector-electrode of the first transistor, which is blocked in a stable condition of the monostable relaxation generator, is connected through a series connection of a coupling resistor and a capacitor, which series connection forms part of said resistance capacitance network, to the base-electrode of the second transistor, and wherein a second capacitor is connected to the junction of said coupling resistor and said first-mentioned capacitor, and forms together with said coupling resistor said differentiating network, and wherein the polarity of the line pulses, applied to said second capacitor, is such that the sum of the differentiated front edge of the first line pulse together with the capacitor voltage blocks the second transistor thereby bringing said multivibrator in an unstable condition, and wherein the discharge time of said first capacitor is such that the sum of the differentiated rear edge of said first line impulse and the discharge voltage across the first capacitor is smaller than the unblocking voltage of the second transistor, and wherein the sum of the differentiated rear edge of the second line impulse and said capacitor voltage is larger than the unblocking voltage of said second transistor which is thus unblocked for bringing said multivibrator into its stable condition.

3. A generator for producing a switching signal for a color television system adapted to process PAL color television signals of the type which include an information signal for PAL synchronization, and wherein said system includes a source of line frequency pulses, said generator comprising first and second transistors of the same conductivity type, means connecting the emitters of said transistors in common to a point of constant potential, first and second collector resistors connected between the collectors of said first and second transistors respectively and a point of operating potential, a capacitor, means connecting one electrode of said capacitor to the base of said first transistor, first resistor means connecting the other electrode of said capacitor to the collector of said second transistor for forming a charging circuit which includes the base-emitter path of said first transistor, said first resistor means and said second collector resistor, second resistor means connected between said one electrode and the emitters of said transistor for forming a discharge path for said capacitor which includes said second resistor means, the emitter-collector path of said first transistor and said first resistor means, means connecting the collector of said first transistor to the base of said second transistor whereby said generator forms a monostable multivibrator, differentiating circuit means for applying said line pulses to said other electrode of said capacitor with a polarity to cut-off said first transistor, and output circuit means connected to at least one of said collector resistors, whereby the output of said generator is a switching signal having a first state with a duration equal to a stroke period and the preceding and succeeding fly-back periods, and second state with a duration of the next succeeding stroke period.

4. The generator of claim 3 wherein said differentiating circuit means comprises second capacitor means connected between said source of line pulses and said other electrode, and said first resistor means.

5. The generator of claim 3 comprising means applying said information signal to the base of said second transistor.

References Cited

UNITED STATES PATENTS 2,735,886 2/1956 Schlesinger ---------- 178—69.5

OTHER REFERENCES

W. Bruch, "Transcoders PAL-NTSC: The Translation of a PAL Signal Into An NTSC Signal and Vice-Versa, NTSC into PAL," from Telefunken-Zeitung, vol. 37, No. 2, pp. 115–135, 1964, pages 115 and 131 relied on.

ROBERT L. GRIFFIN, *Primary Examiner.*

JOHN MARTIN, *Assistant Examiner.*

U.S. Cl. X.R.

307—225, 273; 328—207